UNITED STATES PATENT OFFICE.

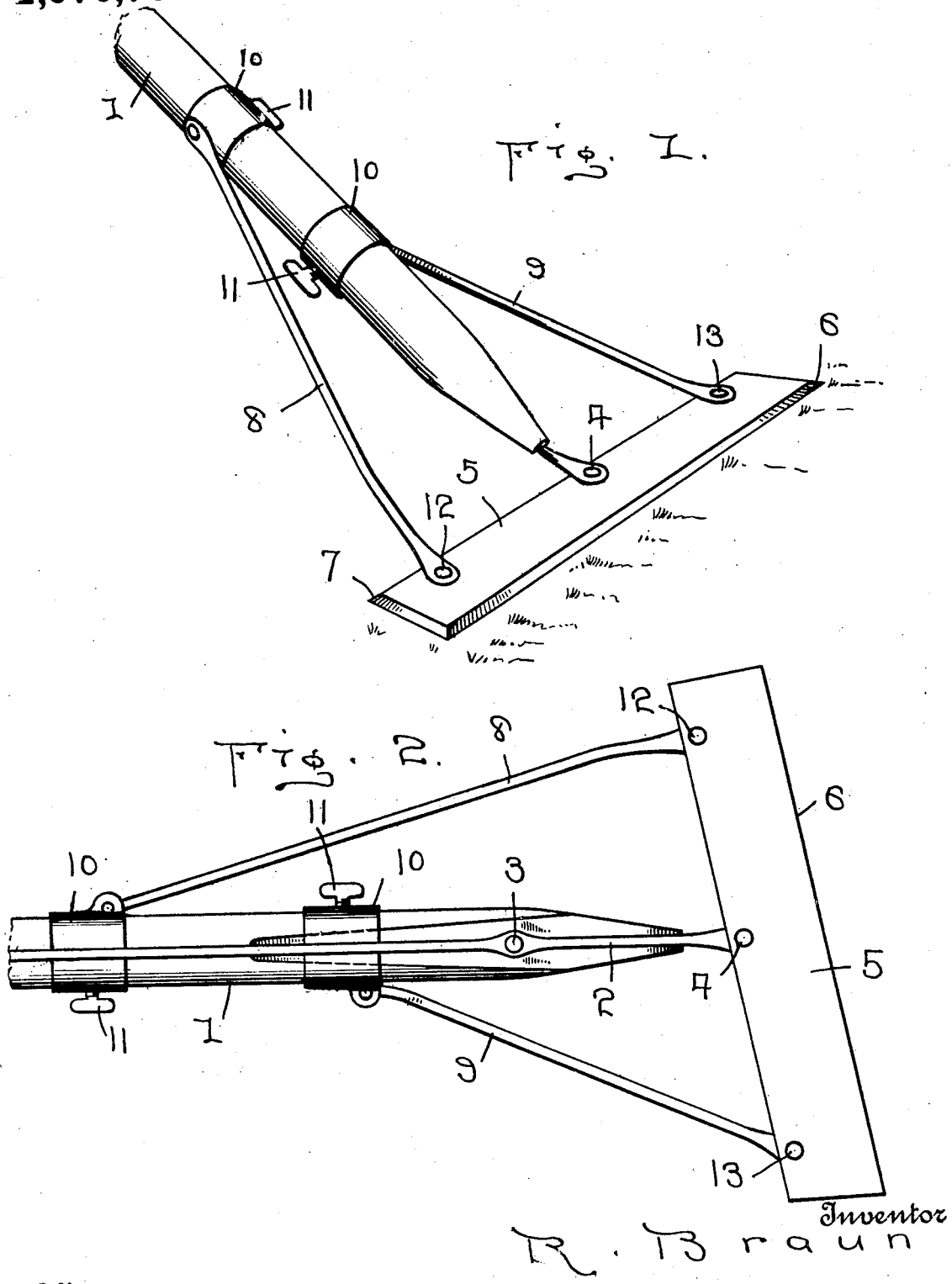

ROBERT BRAUN, OF LA CROSSE, WISCONSIN.

GARDEN TOOL OR CULTIVATOR.

1,070,766. Specification of Letters Patent. Patented Aug. 19, 1913.

Application filed July 2, 1912. Serial No. 707,300.

*To all whom it may concern:*

Be it known that I, ROBERT BRAUN, a citizen of the United States, residing at La Crosse, in the county of La Crosse and State of Wisconsin, have invented certain new and useful Improvements in Garden Tools or Cultivators; and I do hereby declare the following to be a full, clear, and exact description of the invention, such as will enable others skilled in the art to which it appertains to make and use the same.

My invention relates to garden tools or cultivators and it consists of certain novel features of construction and combination of parts the preferred form whereof will be hereinafter set forth in the specification, illustrated in the accompanying drawings and pointed out in the claim.

The object of my invention is to provide a light though thoroughly efficient tool designed for weeding growing plants and thoroughly loosening the surface of the soil so as to produce the best growing conditions.

A further object of my invention is to provide a tool which will be found very efficient for a great variety of purposes and which may be used so that the blade will be ready to cut the weeds and the surface of the soil whether drawn forwardly or rearwardly.

Other objects and advantages will be hereinafter made clearly apparent.

In the accompanying drawings, Figure 1 shows a perspective view of my invention complete, ready for use. Fig. 2 shows a bottom plan view thereof slightly modified.

In order to conveniently refer to the several details of construction involved in materializing my invention, numerals will be employed, the same numeral being applied to the corresponding part throughout the views.

I provide a suitable handle member 1 of any desired material and length and to the lower end thereof I reliably secure the shank member 2 in any suitable manner, as by the bolts or rivets 3, said shank being preferably located on the under side of the handle portion though it may enter the center thereof, if preferred, and to the free end of this shank 2, I pivotally secure, by the rivet 4, the cutting blade 5, which may be made preferably of highly tempered steel and is provided with a front cutting edge, as indicated by the numeral 6, though if deemed desirable a cutting edge 7 may also be provided upon the rear edge thereof, as preferred by the manufacturers.

I pivotally mount the blade 5 so that it may be disposed at any preferred angle relative to the plane of the handle 1 and I accomplish this by the bracing members or arms 8 and 9, each having a collar 10 secured on one end and fitted loosely around the handle, and these collars may be reliably adjusted and anchored at any desired point, as by the set screw 11 or equivalent means. The arms 8 and 9 may be somewhat pliable, so as to compensate for the swing of the end which is secured to the plate; or these arms may be pivoted to the collars 8 and 9, as shown in Fig. 2. The arms 8 and 9 are in like manner pivotally secured to the blade 5, as by the rivets 12 or equivalent means, and it therefore follows that by properly locating the collars 10 upon the handle, the said cutting blade 5 may be disposed at right angles to the handle or at any inclination which may be deemed productive of the best results.

By loosening the set screws 11, it is obvious that the collars may be moved to any desired point, which will leave the blade in the desired adjusted position, when said set screws may be tightened, thereby reliably locking the blade in its adjusted place.

Ordinarily I sharpen or bevel only the front edge of the blade 5, though in many cases it will be found desirable to sharpen both edges as well as the end sections thereof, so that the tool will be efficient when moved in any direction. My improved garden tool will be found useful for an almost endless variety of purposes and may be very cheaply and expeditiously manufactured and sold at a small price. While the cutting edges proper may be thus adjustably secured to their operative positions, it is thought that the best results will follow when the blade is disposed at an oblique angle relative to the plane of the handle section, whereby a shearing or cutting blade is presented to the weeds to be removed, when a simple forward thrust will accomplish thoroughly efficient work.

While I have described the preferred form of my invention I desire to comprehend such substantial equivalents as may be understood to fall fairly within the scope of my invention.

What I claim is:

In a device of the class described, a plate having a cutting edge, a handle member to which the plate is pivotally connected at its medial portion, sleeves slidably mounted on the handle member and carrying means for securing them in adjusted position on the handle member, and brace arms connecting the end portions of the plate with the respective sleeves, whereby the angle of the plate is adjusted by movement of the sleeves on the handle member.

In testimony whereof I have signed my name to this specification in the presence of two subscribing witnesses.

ROBERT BRAUN.

Witnesses:
W. J. HICKISCH,
HUGO H. HICKISCH.